US008677104B2

(12) United States Patent
Gibbs et al.

(10) Patent No.: US 8,677,104 B2
(45) Date of Patent: Mar. 18, 2014

(54) SYSTEM FOR EFFICIENTLY TRACING DATA IN A DATA PROCESSING SYSTEM

(75) Inventors: Michael Gibbs, Cambridgeshire (GB); Paul Anthony Gilkerson, Cambridge (GB); John Michael Horley, Cambridge (GB)

(73) Assignee: ARM Limited, Cambridge (GB)

( * ) Notice: Subject to any disclaimer, the term of this patent is extended or adjusted under 35 U.S.C. 154(b) by 697 days.

(21) Appl. No.: 12/929,058

(22) Filed: Dec. 27, 2010

(65) Prior Publication Data
US 2011/0167247 A1 Jul. 7, 2011

Related U.S. Application Data

(60) Continuation-in-part of application No. 12/801,273, filed on Jun. 1, 2010, now Pat. No. 8,417,923, which is a division of application No. 11/442,594, filed on May 30, 2006, now Pat. No. 7,752,425.

(51) Int. Cl.
*G06F 7/38* (2006.01)
*G06F 9/00* (2006.01)
*G06F 9/44* (2006.01)
*G06F 11/00* (2006.01)

(52) U.S. Cl.
USPC .............. 712/227; 712/236; 714/45; 717/128

(58) Field of Classification Search
None
See application file for complete search history.

(56) References Cited

U.S. PATENT DOCUMENTS

| | | | |
|---|---|---|---|
| 5,333,283 A | 7/1994 | Emma et al. | |
| 5,758,143 A | 5/1998 | Levitan | |
| 6,014,742 A | 1/2000 | Krick et al. | |
| 6,106,573 A | 8/2000 | Mahalingaiah et al. | |
| 6,115,810 A | 9/2000 | Patel et al. | |
| 6,173,395 B1 * | 1/2001 | Wisor et al. .................... | 712/236 |
| 6,233,678 B1 | 5/2001 | Bala | |
| 6,247,146 B1 | 6/2001 | Wheatley et al. | |
| 6,314,530 B1 | 11/2001 | Mann | |
| 6,513,134 B1 | 1/2003 | Augsburg et al. | |

(Continued)

FOREIGN PATENT DOCUMENTS

EP  0 999 498  5/2000

OTHER PUBLICATIONS

U.S. Appl. No. 11/442,594, filed May 30, 2006; Inventor: Williams et al.

(Continued)

*Primary Examiner* — Andrew Caldwell
*Assistant Examiner* — William B Partridge
(74) *Attorney, Agent, or Firm* — Nixon & Vanderhye P.C.

(57) ABSTRACT

A data processing apparatus is provided comprising prediction circuitry for predicting a response of the data processing circuitry at at least one given execution point to execution of a program instruction; tracing circuitry for tracing operation of the data processing apparatus for outputting a prediction indicator indicating whether or not the predicted response is correct; a data store configured to store information relating to the predicted response of said data processing circuitry at the given execution point for use by at least one of said prediction logic and said tracing circuitry a later execution point; and a history buffer configured to store historical information with regard to one or more entries of the data store at a corresponding execution point previous to the given execution point to enable restoration of said data store to a state corresponding to said previous execution point.

23 Claims, 8 Drawing Sheets

(56) References Cited

U.S. PATENT DOCUMENTS

| | | |
|---|---|---|
| 6,647,491 B2 | 11/2003 | Hsu et al. |
| 6,658,557 B1 | 12/2003 | McCoy et al. |
| 7,707,394 B2 * | 4/2010 | Ashfield et al. ............ 712/227 |
| 2001/0032309 A1 | 10/2001 | Henry et al. |
| 2002/0019930 A1 | 2/2002 | Hsu et al. |
| 2002/0194464 A1 | 12/2002 | Henry et al. |
| 2003/0023959 A1 | 1/2003 | Park |
| 2003/0051122 A1 | 3/2003 | Sato |
| 2003/0065912 A1 | 4/2003 | Hum et al. |
| 2004/0030962 A1 * | 2/2004 | Swaine et al. ............ 714/45 |
| 2004/0064685 A1 | 4/2004 | Nguyen et al. |
| 2004/0215720 A1 | 10/2004 | Alexander et al. |
| 2007/0162895 A1 | 7/2007 | Altman et al. |

OTHER PUBLICATIONS

U.S. Appl. No. 11/442,593, filed May 30, 2006; Inventor: Ashfield et al.

IEEE-ISTO, The Nexus 5001 Forum Standard for a Global Embedded Processor Debug Interface, Version 2.0, Dec. 2003, pp. 1-157.

Office action mailed Nov. 18, 2008 in co-pending U.S. Appl. No. 11/442,594.

Office action mailed Mar. 31, 2009 in co-pending U.S. Appl. No. 11/442,594.

Office action mailed Jul. 27, 2009 in co-pending U.S. Appl. No. 11/442,594.

* cited by examiner

| Stage | Execution | Trace | Notes |
|---|---|---|---|
| 1 | 0x1000: BL-> 0x2000 | Branch taken | Push 0x1004 onto data store |
| 2 | 0x2000: BL-> 0x3000 | Branch taken | Push 0x2004 onto data store |
| 3 | 0x3000: MOV | | |
| 4 | 0x3004: BX LR-> 0x2004 | Branch taken | 0x2004 matches top entry on data store so we do not trace the target 0x2004 popped from data store |
| 5 | Interrupt, cancel back to 0x3000 | Cancel back to 0x3000 Interrupt taken | |
| 6 | Return from exception | Exception return | |
| 7 | 0x3000: MOV | | |
| 8 | 0x3004: BX LR-> 0x2004 | Branch taken target 0x2004 | 0x2004 does not match top entry on data store (0x1004), so no match |
| 9 | 0x2004: BX LR-> 0x1004 | Branch taken | 0x1004 matches top entry on data store so we do not trace the target 0x1004 popped from data store |

FIG. 2

| Stage | Execution | Trace | Notes |
|---|---|---|---|
| 1 | 0x1000: BL-> 0x2000 | Branch taken | Push 0x1004 onto data store |
|  |  |  | "push" token added to history buffer |
| 2 | 0x2000: BL-> 0x3000 | Branch taken | Push 0x2004 onto data store<br>"push" token added to history buffer |
| 3 | 0x3000: MOV |  |  |
| 4 | 0x3004: BX LR-> 0x2004 | Branch taken | 0x2004 matches top entry on data store so we do not trace the target<br>0x2004 popped from data store<br>"pop" token added to history buffer |
| 5 | Interrupt, cancel back to 0x3000 | Cancel back to 0x3000<br>Interrupt taken | History buffer analysed, "pop" token is found to be cancelled so we restore 0x2004 to the data store and remove the "pop" token from the history buffer |
| 6 | Return from exception | Exception return |  |
| 7 | 0x3000: MOV |  |  |
| 8 | 0x3004: BX LR-> 0x2004 | Branch taken target 0x2004 | 0x2004 matches top entry on data store so we do not trace target<br>0x2004 popped from data store<br>"pop" token added to history buffer |
| 9 | 0x2004: BX LR-> 0x1004 | Branch taken | 0x1004 matches top entry on data store so we do not trace the target<br>0x1004 popped from data store<br>"pop" token added to history buffer |

FIG. 4

SYSTEM FOR EFFICIENTLY TRACING DATA IN A DATA PROCESSING SYSTEM

This application is a continuation-in-part of U.S. Ser. No. 12/801,273 filed on 1 Jun. 2010 now U.S. Pat. No. 8,417,923 which is a divisional application of U.S. Ser. No. 11/442,594 filed on 30 May 2006, now U.S. Pat. No. 7,752,425 the entire contents of each of which are hereby incorporated by reference in this application.

BACKGROUND OF THE INVENTION

1. Field of the Invention

The present invention relates to data processing and in particular to mechanisms for generating trace data that captures operation of a data processing apparatus.

2. Description of the Prior Art

It is known to perform a diagnostic analysis of operation of a data processing device using trace data generated during execution of a sequence of program instructions. The complexity of modern data processing apparatuses such as microprocessors means that tracing and debugging operation of these data processing apparatuses is a complicated and time-consuming task. Many contemporary data processing apparatuses are configured as small-scale devices such as Systems-on-Chip (SoC). There are constraints in fabrication of such small-scale devices since opportunities for adding monitoring components are limited due to space constraints on the integrated circuit itself and the pins on the periphery of a SoC are also at a premium. This constrains the amount of diagnostic data that can be exported from the SoC for external analysis.

Furthermore, the volume of trace data generated upon performing a full instruction stream and data stream trace becomes prohibitive as the frequency of operation of processor cores increases and as the use of multiple cores on a single device becomes more common place. For example, for existing ARM processor cores and ETM protocols, a bit rate of around 1.5 bits per instruction is output with instruction-only trace. Thus the volume of trace data generated can be very large with a one 1 Giga Hertz (GHz) processor generating around 1.5 Giga bits per second of instruction trace data alone.

It is known to provide an Embedded Trace Macrocell in order to trace and debug a data processing apparatus in real-time with the core operating at full speed, the trace incurring little performance overhead. Such Embedded Trace Macrocells can provide a cycle-accurate trace, generating a sequence of trace data items indicative of processing activities. In order to reduce the bandwidth of trace data that is transferred to a diagnostic apparatus, it is known to provide an Embedded Trace Macrocell that performs compression (i.e. reduction in volume) of trace data and outputs that data in highly compressed form to the diagnostic apparatus. The trace compression is performed by omitting any information that is redundant or can be deduced by the diagnostic apparatus. A decompressor provided in the diagnostic apparatus then reconstructs the full trace stream.

Thus some existing Embedded Trace Macrocells are configured to remove from the full state of the processor various pieces of data that can be inferred by a decompressor of a diagnostic apparatus. For example, the program counter is not transmitted upon execution of every instruction, since it can be assumed that instructions are generally processed sequentially. Furthermore, the program counter is not transmitted on direct branch instructions because the target of a direct branch instruction can generally be inferred by examining the program code in the decompressor of a diagnostic apparatus. However, other types of branch instructions such as indirect branch instructions which, rather than specifying the address of the next instruction to execute (as in a direct branch instruction), an argument of the indirect branch instruction specifies where the next address is located. Thus, for indirect branches, the address of an instruction to branch to could be stored in a register specified by an opcode of the instruction or could be specified by the value of a memory location. Thus for indirect branches the address to be jumped to is not known until the instruction is actually executed. Such indirect branch instructions are typically associated with a higher than average volume of trace data. Thus although trace compression can be used to reduce the average number of bits used to trace an individual instruction, the nature of the instruction could mean that compression is not as easily achieved.

U.S. patent application Ser. No. 11/442,594 assigned to ARM Limited and issued on 6 Jul. 2010 describes a known system of making predictions in a trace data stream to reduce the trace protocol bandwidth. The system described therein employs a data store (the "return stack") in the Embedded Trace Macrocell for predicting the return addresses of branch to subroutine instructions (known as branch-with-link instructions in the ARM architecture). The data store operates by pushing the return address of a branch to subroutine instruction onto a stack memory, which is basically a last-in first-out memory. In the event of an indirect branch such as a branch back from a subroutine, the top entry of the data store is compared with the actual branch target determined upon execution. If there is a match then the trace circuitry does not output a branch address to the diagnostic apparatus because a corresponding data store in the decompression circuitry of the diagnostic apparatus should be able to correctly predict the same return address. The diagnostic apparatus makes this prediction from an image of the program code executed by the data processing apparatus and from the diagnostic apparatus data store entries. Trace logic within the Embedded Trace Macrocell is arranged to monitor operation of the Central Processing Unit (CPU) to determine if the prediction made with regard to the branch target address is correct or not and to output either (i) a prediction correct indicator if the prediction is correct; or (ii) an indication of where the program is actually branched to if the prediction is incorrect.

In the case of return from subroutine instructions, the prediction of where the branch is likely to go will often be correct. Thus, provided the diagnostic apparatus that receives the trace data and decompresses the trace data makes an identical prediction, in many cases it should not be necessary for the ETM to output the branch destination information to the diagnostic apparatus, but simply to output an indication that the prediction is correct. This reduces the volume of trace data in relation to return from subroutine instructions. Only in the event that the prediction turns out to be incorrect should a higher volume of trace data be output. The use of prediction of return addresses for branch instructions can be particularly useful for indirect branch instructions where the branch return address cannot be determined from the program code alone.

However, although use of the data store and the prediction circuitry can be effective in reducing the volume of trace data output in relation to branch instructions, a problem can arise because this prediction system heavily relies on maintaining synchronism between the tracing hardware and the decompression circuitry of the diagnostic apparatus to ensure that the predicted addresses are synchronised at the two ends of the system. This poses a particular problem where the data processing apparatus is set up to perform speculative fetching and/or speculative execution of program instructions. Implementation of speculative execution is commonplace in modern data processors because of the opportunities the technique provides for faster operation, for example, by avoiding pipeline stages remaining idle for extended periods of time.

However, speculative instruction execution presents trace circuitry with a difficulty, because until speculation is resolved (i.e. until it is known whether or not a given instruction was actually committed by a CPU), the trace circuitry is unable to provide a stream of trace data that definitively indicates the actual operation of the data processing apparatus. One possibility is for the trace unit to buffer all of the trace data it generates until speculation is resolved, but this requires a prohibitively large buffer memory, particularly if the speculation depth of the processor is significant. An alternative technique is to generate the trace data speculatively along with the speculatively executed instructions and to subsequently cancel some items of trace data if it is found that those instructions to which that trace data corresponds were in fact mis-speculated. For example, the Nexus protocol "The Nexus number 5001 Forum-Standard for a Global Embedded Processor Debug Interface" (IEEE-ISTD 5001-2003, 23 Dec. 2003) supports the cancelling of a specified number of trace data items.

However, even if the data processing apparatus specifically indicates to the trace unit which instructions or groups of instructions should be cancelled, identifying the items of trace data that correspond to those cancelled instructions can be problematic. The situation can be exacerbated in systems comprising a data store to reduce trace data associated with branch instructions (as described in U.S. patent application Ser. No. 11/442,594) because the tracing circuitry will typically resolve speculation prior to analysing the data store. As a consequence, some speculatively executed instructions may result in data being added to or removed from the data store and when that speculated instruction is subsequently cancelled, the data store of the decompression circuitry and the data store of the tracing circuitry can easily become out of step.

It is of course it is possible to avoid using a data store when performing tracing of data in a processor capable of speculative execution to avoid the ETM and the decompression circuitry becoming out of step in this way. However, the data store can show an improvement in trace bandwidth so it is desirable to retain use of the data store even in systems that perform speculative fetching and/or speculative execution of instructions. However, it is also a requirement that the trace data output by ETMs incorporating a data store should reliably and accurately reflect the actual operation of the data processing system being traced.

SUMMARY OF THE INVENTION

According to a first aspect the present invention provides a trace unit configured to generate items of trace data indicative of processing activities of a data processing apparatus, said trace unit comprising; prediction circuitry for predicting a response of said data processing circuitry at at least one given execution point to execution of a program instruction; tracing circuitry for tracing operation of at least a portion of said data processing apparatus and for determining whether said predicted response to said program instruction is correct and for outputting a prediction indicator indicating whether or not said predicted response is correct; a data store configured to store information relating to said predicted response of said data processing circuitry at said at least one given execution point for use by at least one of said prediction logic and said tracing circuitry a later execution point; and a history buffer configured to store historical information with regard to one or more entries of said data store at a corresponding execution point previous to said at least one given execution point to enable restoration of said data store to a state corresponding to said previous execution point.

Provision of prediction circuitry for predicting a response of data processing circuitry at at least one given execution point to execution of a program instruction provides the opportunity for reducing the volume of trace data output for certain instructions. Furthermore, provision of a data store for storing information related to predicted responses of the data processing circuitry at at least one given execution point for use by one or more of the prediction logic and the tracing circuitry at a later execution point enables predictions to be checked and where verified to avoid output of full addresses to the diagnostic circuitry. The use of the prediction circuitry together with the data store has been shown to offer an improvement in trace bandwidth and thus is desirable to implement. However, the present invention recognises that the accuracy and effectiveness of such a prediction technique relies upon the prediction circuitry and the data store remaining in step with corresponding prediction circuitry and a corresponding data store in the diagnostic apparatus responsible for analysing the output trace data. The present invention recognises that provision of the history buffer configured to store historical information with regard to one or more entries of the data store at a corresponding execution point previous to the given execution point to enable restoration of the data store to a state corresponding to the previous execution point enables the trace unit and the diagnostic circuitry to be kept in step and should prevent errors in the event that entries in the data store were erroneously made or erroneously removed. Such errors may arise, for example, as a result of instructions that were speculatively executed but later determined to have been mis-speculated or instructions that were speculatively fetched and not subsequently executed to completion by the data processing apparatus.

The ability to restore the data store to the previous state to correct for mis-speculation and/or misguided pre-fetching of instructions provides a more flexible system in which the contents of the data store of the trace unit are likely to have improved accuracy and can more readily be synchronised with the corresponding data store in the diagnostic apparatus. The use of the history buffer is more efficient than the option of simply flushing the trace unit data store upon recognition of a potential problem with entries in the data store, e.g. due to mis-speculation, because repeatedly flushing the data store reduces its effectiveness in improving the trace bandwidth.

It will be appreciated that the prediction circuitry could predict a response of the data processing circuitry or a part thereof to execution of any type of program instructions such as unconditional instructions or conditional instructions. For example, the prediction could be implemented such that all unconditional instructions are predicted as being executed or where a conditional instruction follows an unconditional instruction it can be predicted that it will be executed. Instructions processed by ARM processor cores can be conditional on some predetermined state of the data processing apparatus and hence are only executed if that state has a particular value or values. Such instructions include a wide range of operations and not just branch instructions. However, in some embodiments, the program instruction for which the prediction is made by the prediction circuitry comprises a branch instruction and the prediction circuitry predicts a response to execution of a future branch instruction. The data store is useful for compressing trace output in relation to branch instructions because certain assumptions can be reliably be made about execution of branch instructions. For example, for ARM branch-with-link instructions the return address can be assumed to be address following the branch instruction itself. Thus the information related to the predicted response of the data processing circuitry stored in the data store can be a value indicative of an address subsequent to a branch to a subroutine instruction address. Tracing circuitry can then determine whether or not the predicted response to the branch instruction is correct and output a prediction indicator indicating whether or not the particular predicted response is in fact correct.

For correct predictions the branch return address stored in the data store can be assumed to be derivable by a diagnostic apparatus without actually outputting the full address and thus a reduction in trace data can be readily achieved. Furthermore, upon completion of a subroutine, it can be predicted that program flow will return to the instruction immediately subsequent to the branch to subroutine instruction that actually called the subroutine. Since a given subroutine may be called from many different points in a program application, the instruction that returns to the caller must be an indirect branch and thus the return address is unpredictable when the program is executing code within the subroutine itself. Thus information regarding where the subroutine was called from (for example, the instruction address of the branch to subroutine instruction itself) can be stored in the data store and used to determine a probable return address for the subroutine. Clearly at the point of executing the branch to subroutine instruction, this information is known and it can be conveniently placed in the data store ready for retrieval when the indirect branch back from the subroutine instruction is processed i.e. when the future branch instruction is processed.

It will be appreciated that the use of the history buffer together with the data store and the prediction circuitry could be applied to any data processing system capable executing any stream of instructions. However, in some embodiments the data processing apparatus that the trace unit is configured to trace is configured to perform speculative execution of program instructions and the tracing circuitry is configured to output trace data corresponding to at least one speculatively executed instruction before that at least one speculatively executed instruction is committed by the data processing apparatus and wherein the previous execution point is an execution point prior to execution of the speculatively executed instruction. Thus it can be readily determined in the event of one or more speculatively executed instructions having been mis-speculated whether or not that mis-speculation resulted in data being added to or removed from the data store. Addition to or removal of data from the data store where associated with mis-speculation can cause the data store of the trace unit to become out of step with the corresponding data store in the diagnostic apparatus and can thus lead to inaccuracies in implementation of the predictions. However, provision of the history buffer enables the data store to save a state corresponding to the previous execution point i.e. to save a state prior to execution of the mis-speculatively executed instruction. This enables the reduction in trace bandwidth associated with use of a data store to be exploited yet removes or at least reduces the likelihood of errors resulting from mis-speculations. An alternative method to keeping a diagnostic apparatus in step with the trace unit is for the diagnostic apparatus to analyse the speculatively executed instructions and to determine when the trace unit changes information stored in the data store (of the trace unit). However, this is an inferior solution to keeping the trace unit and the diagnostic unit in step relative to providing the trace unit with the history buffer because when a processor performs speculative execution, the diagnostic apparatus cannot always reliably determine exactly what was executed by the processor and in such circumstances cannot reliably keep in step with the trace unit.

In other embodiments, the data processing apparatus is configured to perform speculative fetching of program instructions and the tracing circuitry is configured to output trace data corresponding to at least one speculatively fetched instruction before the data processing apparatus resolves whether the speculatively fetched instruction should be executed to completion. In these embodiments, the previous execution point corresponding to which the data store is restored using the history buffer is an execution point prior to commencement of execution of the speculatively fetched instruction. This prevents data being erroneously added to or removed from the data store as a result of tracing of a speculatively fetched instruction that is never actually executed to completion and helps retain the accuracy of the prediction mechanism by ensuring that the prediction circuitry and data store of the trace unit are kept in step with the corresponding circuitry in the diagnostic apparatus that is decompressing the trace stream and reproducing the predictions.

In embodiments where the data processing apparatus is configured to perform speculative execution of program instructions, the trace unit can be configured to receive from the data processing apparatus a cancel indication indicating that at least one speculatively executed instruction has been mis-speculated and the trace unit is responsive to the cancel indication to use the historical information stored in the history buffer to restore the data store to the state prior to execution of the speculatively executed instruction. The responsiveness of the trace unit to the cancel indication in this way provides an efficient mechanism via which to analyse the data store to determine whether or not data has been erroneously added or erroneously removed from it as a result of mis-speculation. This is a convenient way to invoke the capability of the history buffer to restore the data store to a previous state.

In some embodiments capable of speculative execution, the trace unit is configured to receive from the data processing apparatus a cancel indication indicating that said at least one speculatively executed instruction has been mis-speculated and the trace unit is responsive to the cancel indication to update the data store to correct for the mis-speculation and to remove information associated with said mis-speculated instruction from said data store.

In some such embodiments where the trace unit is responsive to the cancel indication from the data processing apparatus, if following receipt of the cancel indication the trace unit determines that the history buffer is empty, then the trace unit is configured to flush the data store. This ensures that whenever there is a likelihood that the data store has been modified in response to execution of a mis-speculated instruction, the erroneous information in the data store is not in fact used because the data store is flushed. This removes or at least reduces the likelihood of any problems occurring as a result of predictions made by the trace unit that cannot be accurately reproduced by the diagnostic circuitry.

In some embodiments in which the data processing apparatus is configured to perform speculative execution of program instructions, the trace unit is configured to receive from the data processing apparatus a commit indication indicating that the at least one speculatively executed instruction has been committed by the data processing apparatus (i.e. that the speculation has been resolved) and the trace unit is responsive to the commit indication to remove any entries corresponding to committed ones of the speculatively executed instructions from the history buffer. This ensures that the potentially limited space in the history buffer is efficiently used by removing entries that will no longer be required for the purpose of the predictions.

In alternative embodiments, the trace unit is configured to receive from the data processing apparatus a commit indication indicating that the at least one speculatively executed instruction has been committed and the trace unit is responsive to the commit indication to mark any entries in the history buffer corresponding to committed response of the speculatively executed instruction as committed entries. This allows the trace unit to detect when the history buffer is truly empty and to distinguish that situation from a situation where all of the speculative entries have been resolved as committed due to having been identified as corresponding to committed instructions. This can help to avoid unnecessary flushes of the data store because flushing of the data store will not be required where it is known that all of the entries correspond to committed instructions.

It will be appreciated that the data store and the history buffer could be configured to have the same capacity. However, in some embodiments the data store has a first capacity and the history buffer has a second capacity and the first capacity is different from the second capacity. This conveniently allows the capacity of the data store and the history buffer to be varied independently to find the most cost-effective combination to suit the processing scenario.

It will be appreciated that the history buffer could store historical information with regard to entries of the data store in many different forms. However, in some embodiments, the history buffer is configured to store for at least one data store entry, information identifying a program instruction. Provision of the instruction identifier provides for easy identification of cancelled instructions and associated entries in the data store.

In other embodiments the history buffer is configured to store information identifying if an operation performed on the data store was a pop operation involving removal of a data entry from the data store or a push operation involving writing a data entry to the data store. This makes it efficient to identify when data has been stored in the data store in association with a mis-speculated instruction or removed from the data store as a result of mis-speculated instruction.

For trace units in which the history buffer is configured to store information identifying if an operation performed on the data store was a pop operation involving removal of a data entry from the data store or a push operation involving writing a data entry to the data store, some embodiments comprise a restoration buffer configured to store information corresponding to at least a portion of data removed from the data store during the pop operation. This enables subsequent restoration of the removed data back to the data store. This provides a convenient way of keeping track of data that was removed from the data store but which may later have to be restored as a result of mis-speculation or incorrect pre-fetching of instructions. For data that is erroneously stored in the data store as a result of mis-speculation there is no requirement to store copies of the stored data such as the stored address, since this data can simply be removed from the data store in the event of mis-speculation being identified.

In some embodiments at least one of the history buffer and the restoration buffer are configured as distinct memory units with regard to the data store. This provides flexibility in independently configuring these two units and makes them adaptable to different execution environments and different applications. In alternative embodiments, the data store comprises one or more of the restoration buffer and the history buffer as an integral part of the memory unit forming the data store. This provides a convenient way of reducing the area on an integrated circuit required to accommodate the data store and history buffer and the integration of can be readily implemented due to the close relationship between the data of the data store and the restoration buffer.

In some such embodiments where the data store comprises the history buffer as an integral part of a memory unit forming the data store, each entry of the data store comprises a corresponding status indicator for distinguishing between currently valid predicted response information and historical predicted response information. This provides an efficient and convenient way of distinguishing between the historical data and the currently valid data.

It will be appreciated that the history buffer could be updated as required by the particular implementation. However, in some embodiments the history buffer is updated upon each write to or each eviction from the data store. This ensures that the history buffer is kept up to date and thus improves its performance.

According to a second aspect the present invention provides a data processing apparatus comprising: data processing circuitry for performing data processing operations; prediction circuitry for predicting a response of said data processing circuitry at at least one given execution point to execution of a program instruction; tracing circuitry for tracing operation of at least a portion of said data processing apparatus and for determining whether said predicted response to said program instruction is correct and for outputting a prediction indicator indicating whether or not said predicted response is correct; a data store configured to store information relating to said predicted response of said data processing circuitry at said at least one given execution point for use by at least one of said prediction logic and said tracing circuitry a later execution point; and a history buffer configured to store historical information with regard to one or more entries of said data store at a corresponding execution point previous to said at least one given execution point to enable restoration of said data store to a state corresponding to said previous execution point.

According to a third aspect the present invention provides data processing apparatus, said method comprising the steps of:

predicting a response of said data processing circuitry at at least one given execution point to execution of a program instruction;

tracing operation of at least a portion of said data processing apparatus and determining whether said predicted response to said program instruction is correct and outputting a prediction indicator indicating whether or not said predicted response is correct;

storing in a data store information relating to said predicted response of said data processing circuitry at said at least one given execution point for use by at least one of said prediction logic and said tracing circuitry a later execution point; and storing historical information with regard to one or more entries of said data store at a corresponding execution point previous to said at least one given execution point to enable restoration of said data store to a state corresponding to said previous execution point.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 is a table that schematically illustrates a response of a trace unit to a sequence of instructions and shows how errors can arise in the data store as a result of mis-speculation;

FIG. 4 is a table that schematically illustrates the same nine stages of instruction execution as a table of FIG. 2, but as executed in a data processing apparatus according to an embodiment of the present invention that makes use of a history buffer to ensure that any data erroneously removed from the data store is restored;

DESCRIPTION OF EMBODIMENTS

Figure 1A:
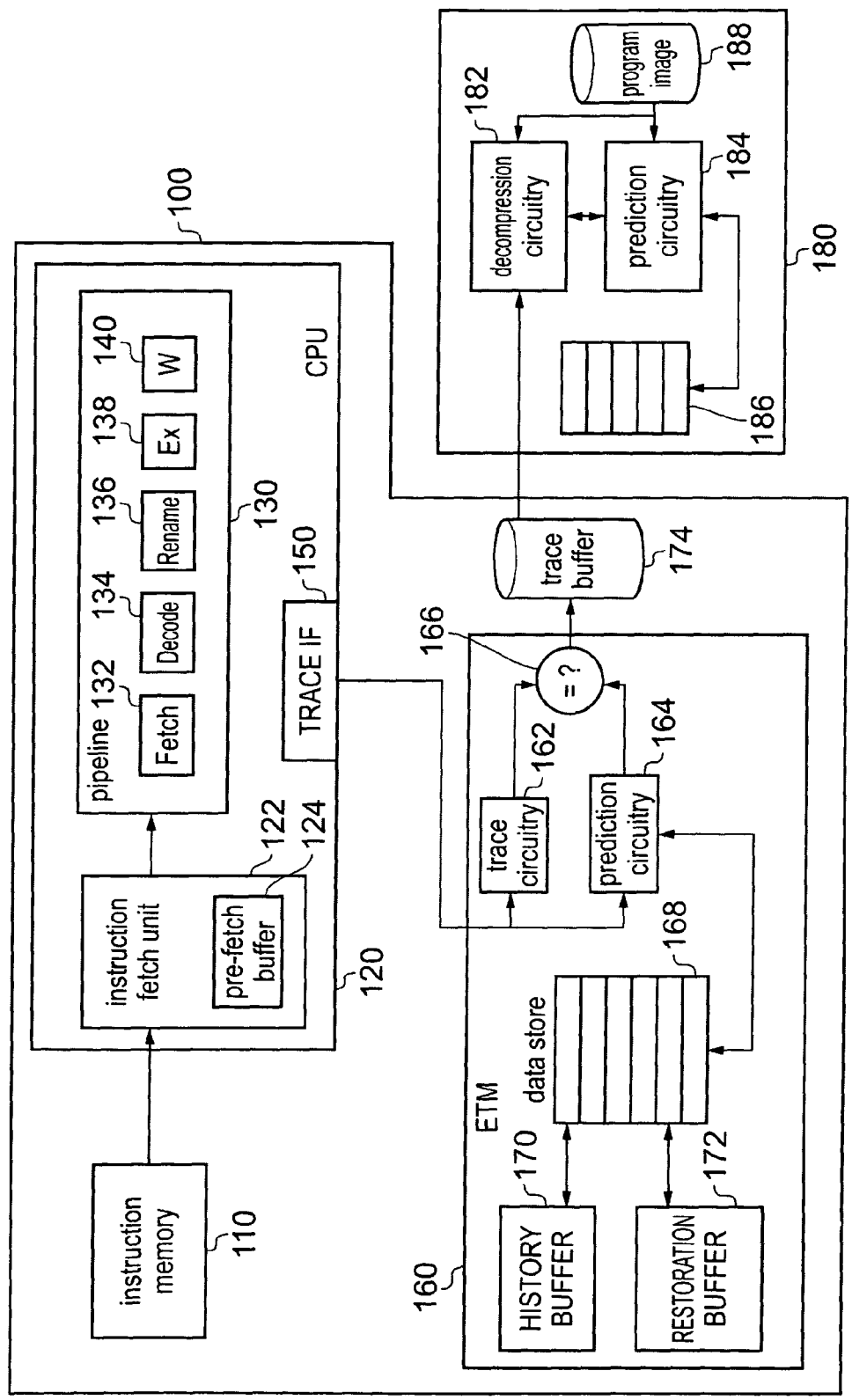
FIG. 1A schematically illustrates a trace unit and diagnostic apparatus according to a first embodiment of the present invention in which the restoration buffer the history buffer and the data store are separate memory units.

FIG. 1A schematically illustrates a first embodiment of a trace system comprising a data processing apparatus 100 and a diagnostic apparatus 180 according to a first embodiment of the present invention.

The data processing apparatus 100 comprises an instruction memory 110 storing program instructions for execution by a central processing unit (CPU) 120. The central processing unit 120 comprises an instruction fetch unit 122 that fetches instructions directly from the instruction memory 110 and the instruction fetch unit 122 itself comprises a pre-fetch buffer 124 for speculatively fetching instructions from the instruction memory 110 in anticipation of those instructions being required by an execute stage of a pipeline 130. The pipeline 130 comprises a number of pipelined data processing stages, which include a fetch stage 132, a decode stage 134, a rename stage 136, an execute stage 138 and a write back stage 140. The rename register 136 is present due to the capability of the central processing unit 120 for performing speculative execution of program instructions in addition to speculative fetching of program instructions. The central processing unit 120 further comprises a trace interface 150 that outputs trace data to an Embedded Trace Macrocell (ETM) 160.

The capability of the central processing unit 120 to perform speculative execution enables faster operation to be achieved since it can avoid pipeline stages of the pipeline 130 remaining idle for significant periods of time. However, speculative instruction execution can present the ETM 160 with difficulties in tracing operation of the central processing unit 120 because, until it is actually known whether a speculatively executed instruction was actually committed, i.e. until it is known whether or not the speculation is resolved, the ETM 160 is unable to provide to the diagnostic apparatus 180 a stream of trace data that definitely indicates the actual operation of the central processing unit 120 uncontaminated by mis-speculation.

In the embodiment of FIG. 1A, the ETM 160 generates trace data speculatively before it is known whether or not the speculatively executed instructions are actually committed. However, the ETM 160 is responsive to an indication from the trace interface 150 of the central processing unit 120 to cancel mis-speculated instructions to also cancel certain items of trace data determined to be associated with the mis-speculated instructions. For example, the Nexus protocol ("The Nexus 5001 Forum-Standard for a Global Embedded Processor Debug Interface", IEEE-ISTO 5001-2003, 23 Dec. 2003), which supports the cancelling of a specified number of trace data items can be implemented in the embodiment of FIG. 1A and FIG. 1B for this purpose.

Instruction pre-fetch is performed by the pre-fetch buffer 122 to speed up execution of a program by reducing wait states. Since the central processing unit 120 itself can process instructions faster than instructions can actually be retrieved from the instruction memory 110, the pre-fetch buffer is used to cache instructions read from the instruction memory 110 before they are actually needed by the pipeline 130. Storage of the program instructions in the pre fetch-buffer 122 means that when an instruction is actually needed that instruction can be accessed much more quickly from the pre-fetch buffer 124 in comparison to having to access it directly in the instruction memory 110. The pre-fetch of instructions can be performed sequentially according to a program order or alternatively pre-fetch can be implemented as part of a branch prediction algorithm, where the CPU 120 attempts to anticipate the result of a calculation and fetch the correct instructions in advance.

In the case of pre-fetching of instructions for the purpose of a branch prediction algorithm, it will be appreciated that there will be occasions when some of the pre-fetched program instructions are not actually required by the processor once the accuracy to of the branch prediction has been determined, i.e. once it is determined whether the predictive branch is actually taken or not. Thus pre-fetched program instructions stored in the pre-fetch buffer 122 may have to be cancelled similarly to the cancellation of speculatively executed program instructions that have progressed further down the pipeline 130. The present technique offers particular benefits for central processing units that perform at least one of instruction pre-fetch and speculative execution.

The ETM 160 is used to perform real-time trace operation of the central processing unit 120 such that when the CPU 120 is running, then the ETM 160 collects n. instruction information and/or data transfer events and compresses this information for delivery off-chip to the diagnostic apparatus 180. Alternatively, the trace data can be buffered on-chip for post processing. The use of the ETM 160 is an alternative to performing conventional debugging, which typically involves setting break points and/or watch points in the program code to halt the processing unit and uses a debug operation to examine or modify register or memory and perform single-step operations to understand how the program works. The ETM 160 enables the CPU 120 to be traced at full speed with little or no performance overhead and allows for a cycle-accurate trace.

The ETM 160 comprises trace circuitry 162, prediction circuitry 164, a comparator 166 that compares an output of the trace circuitry 162 with an output of the prediction circuitry 164. A trace buffer 174 is provided between the ETM 160 and the diagnostic apparatus 180 for storing the outcome of the comparison. The ETM 160 further comprises a data store 168, a history buffer 170 and a restoration buffer 172.

The output of the trace buffer 174 is provided to the diagnostic apparatus 180. The diagnostic apparatus 180 comprises decompression circuitry 182, prediction circuitry 184, a data store 186 and a program image 188. The trace buffer 174 output is provided to the decompression circuitry. Thus it can be seen that the ETM 160 has both the data store 168 and the prediction circuitry 164 and similarly the diagnostic apparatus has its own instances of the data store 186 and the prediction circuitry 184. A program image 188 stored in the diagnostic apparatus 180, this program image 188 is a copy of the same program instructions that are being executed by the pipeline 130 of the CPU 120.

It is important that the diagnostic apparatus 180 is able to perform an analysis of the program code being executed so that the incoming trace data received from the trace buffer 174 can be effectively analysed. The fact that predictions are made with regard to the outcome of future branch instructions by the prediction circuitry 164 of the ETM 160 means that corresponding predictions must be made by the prediction circuitry 184 of the diagnostic apparatus 180 to make sense of the incoming trace data. The use of prediction enables the volume of trace data output by the ETM 160 to be reduced, since some of the information is reconstructed from the trace data stream by the diagnostic apparatus 100 and thus is not output by the ETM 160.

The trace data output by the trace buffer 174 contains information regarding whether or not predictions made by the prediction circuitry 164 of the ETM 160 are correct or not and thus it is important that the decompression circuitry 180 is able to reconstruct predictions made by the ETM 160 in order to use the received information productively. This is why the prediction circuitry 184 and the data store 186 of the diagnostic apparatus 180 mirror the prediction circuitry 164 and a data store 168 of the ETM 160.

The prediction circuitry 184 of the diagnostic apparatus 180 supplies its predictions to the decompression circuitry 182. It is important that the decompression circuitry 182 and the ETM 160 should remain in-step to ensure, for example, that the decompression circuitry 182 always pops the correct address from the data store 186 corresponding to the address that was stored on the ETM data store 168 in relation to a corresponding prediction. The use of the prediction circuitry 164 and the data store 168 is described in more detail in U.S. patent application Ser. No. 11/442,594. However, the use of the history buffer 170 and the restoration buffer 172 are not previously known.

The trace circuitry 162 of the ETM receives trace information from the CPU 120 via the trace interface 150 with regard to instructions executed by the pipeline 130 and the ETM prediction circuitry 164 predicts how the CPU 120 is expected to behave in response to execution of a given program instruction. The trace circuitry 162 receives the information from the trace interface 150 from the CPU 120 with regard to how the CPU 120 actually did behave upon execution of the given program instruction at a point in time corresponding to a processing cycle subsequent to the processing cycle in which the prediction was made. The accuracy of the earlier prediction is determined by sending the predicted outcome related to the given program instruction to the comparator 166 for comparison with trace data indicating a result of actual execution of that given program instruction, which is supplied to the comparator via the trace circuitry 162. A prediction indicator is then output to indicate whether or not the prediction made by the prediction circuitry was correct or not.

The prediction indicator in this embodiment is a single bit value indicating either "prediction correct" or "prediction intercorrect". If the prediction was in fact correct then the amount of trace data output to the trace buffer and subsequently to the diagnostic apparatus 180 can be reduced since the prediction can be reliably reproduced by the decompression circuitry 182 and the prediction circuitry 184 of the diagnostic apparatus 180. However, if the comparison performed by the comparator 166 shows that the prediction is incorrect then the processor did not behave as predicted and this requires that further trace information concerning the actual behaviour of the CPU 120 should be output to the diagnostic apparatus 180. In cases where there are only two possible outcomes of the CPU 120 behaviour with regard to predictions then the additional information required may be only prediction incorrect information. This would be the case, for example, if the prediction regarded whether or not a conditional instruction executed. However, where there are more possible outcomes, further information is output from the trace circuitry 162 to the trace buffer 174 and the diagnostic apparatus 180. For example, in a case where the prediction related to branch-with-link instruction and the link address to which the program sequence returned following execution of the branch was mis-predicted by the prediction circuitry 164, the actual return address of the branch-with-link instruction would have to be output to the diagnostic circuitry to form an accurate pattern of actual behaviour of the CPU 120.

The information required for output to the diagnostic apparatus 180 is stored in the trace buffer 174, which in this embodiment is contained within the data processing apparatus 100. However, in alternative embodiments, the trace buffer is external to the data processing apparatus 100. The trace information is supplied from the trace buffer 174 to the diagnostic apparatus 180. The decompression circuitry 182 in the diagnostic apparatus decompresses the trace data received from the trace buffer 174 and refers to the program image 188 to make predictions with regard to, for example, return addresses for branch-with-link instructions or return addresses for indirect branches and stores predicted return addresses on the diagnostic apparatus data store 186 for use by the decompression circuitry 182 in reconstructing a full set of trace data based on the trace data received from the trace buffer 174.

The trace data received from the trace buffer 174 enables the decompression circuitry 182 to have access to information with regard to previous behaviour of the CPU 120 and also makes use of the program image 188 to predict outcomes of execution of future instructions in the program sequence. Due to the compressed nature of the trace data received from the trace buffer 174, the prediction circuitry 184 and the data store 186 are required in conjunction with the program image 188 to reconstruct a full picture of the behaviour of the CPU 120 as if a full set of uncompressed data had been output from the ETM 160 to the diagnostic apparatus 180. Thus it is important that the diagnostic apparatus 180 should be in step with the ETM 160 in making the same predictions that are made by the ETM 160 in order that the diagnostic apparatus 180 can readily use the compressed trace information received by the decompression circuitry 182.

The data store 168 of the ETM 160 is used specifically to store the address of an instruction following a branch to subroutine instruction. The instruction following a branch to subroutine instruction is generally the return address from the subroutine and thus the prediction circuitry 164 stores the address of the instruction following the branch to subroutine instruction in the ETM data store 168 as the predicted return address from that subroutine. Once a program sequence has actually branched into executing instructions of a subroutine, because the subroutine can potentially have been called from many different points in the main body of the program, the return address once the sub routine has been fully executed will not necessarily be known. This is known as an indirect branch instruction. Accordingly, the use of the ETM prediction circuitry 164 to store a predicted return address on the data store 168 enables the processing activity of the pipeline 130 following execution of the subroutine to be predicted.

Branch-with-link type instructions such as the branch-with-link instruction of the ARM architecture are similar to subroutine calls. In response to a branch-with-link instruction, an ARM processor copies a program counter held in register R15 into a link register R14 so that the branch-with-link preserves the return address from the branch in register R14. A return from the subroutine is then made by copying the saved value of the program counter from R14 back into the program counter register R15. The branch-with-link instruction can be made conditional so that a full set of conditional subroutine calls can be implemented. The prediction circuitry 164 stores the link address corresponding to predicted behaviour in response to branch-with-link instruction on the ETM data store 168. During execution of program instructions, when the pipeline 130 of the CPU 120 executes a branch instruction possibly indicating a return from a subroutine then the trace circuitry 162 receives information regarding the branch instruction's actual behaviour and compares the target address of the branch instruction with the corresponding address stored in the data store 168 based on a prediction made by the prediction circuitry 164 to see if the target address is indeed the predicted return address. If the comparison shows the addresses to be the same, the CPUs behaviour is indeed as predicted and a prediction indicator that indicates "prediction correct" is output to the trace buffer to the diagnostic apparatus 180 via the trace buffer 174 and the predicted return address is removed from the ETM data store 168. in this circumstance where the prediction is in fact correct, because that prediction can be recreated by a combination of the prediction circuitry 184, the program image 188 and the data store 186 of the diagnostic apparatus, there is no need to actually output the return address from the ETM 160 to the diagnostic circuitry. This reduces the trace bandwidth. If on the other hand, the return address is not as predicted then an signal indicating what the return address should actually be is output to the diagnostic apparatus 180 via the trace buffer 174 and the ETM data store 168 is left unchanged. In the event of a mis-predicted branch return address, the trace data that is output may correspond to the sole target address itself or it could be an indication of the difference between the address of the branch instruction and the target return address.

Thus it can be seen that the data store 168 of the ETM 160 operates by pushing the return address of a branch-with-link or branch to subroutine instruction onto the ETM data store 168 and upon returning from a sub routine (i.e. on an indirect branch) comparing the top entry of the data store 168 with the actual branch target indicated by the trace data received from the CPU trace interface 150 by the trace circuitry 162. If there is a match, then the ETM does not output the branch address because the decompression circuitry 182 is simply able to pop the address off the corresponding diagnostic apparatus data store 186. This relies on the decompression circuitry 182 and the ETM 160 remaining in step to ensure that decompression circuitry 182 always pops the correct address from the data store 168. The ETM data store 168 and the corresponding diagnostic apparatus data store 186 operates as a last-in-first-out (LIFO) memory, where the most recently stored address is read out first. However, a problem can occur with retaining consistency between the data store of the ETM 160 and the data store 186 of the diagnostic apparatus 180 in the event of either: (i) an instruction having been pre-fetched by the pre fetch buffer 122 not actually being executed by the pipeline 130; or (ii) an instruction that was speculatively executed by the pipeline 130 and for which trace data output via the trace interface 150 being later discovered to be mis-speculated and cancelled by the CPU 120 via a cancel message sent out to the ETM 160 from the CPU trace interface 150.

If cancellation of a branch-with-link instruction or an indirect branch instruction occurs, then the tracing circuitry resolves the speculation by responding to the cancel message from the CPU trace interface 150 without analysing the ETM data store 168. This can result in a push to or a pop from the ETM data store 168 being discarded which can consequently result in the decompression circuitry 182 of the diagnostic apparatus 180 becoming out of step with the ETM 160 due to the fact that a corresponding push or pop from the diagnostic apparatus data store 186 will not have been performed. However, implementation of the history buffer 170 and the restoration buffer 172 keeps the ETM data store 168 and the diagnostic apparatus data store 168 in step by providing the ability to restore or discard entries on the data store 168 of the ETM that have been added or removed as a result of a retrospectively misguided response to a cancelled instruction.

The history buffer 170 stores historical information with regard to one or more entries of the data store 168 to enable restoration of the data store 168 to a state corresponding to a previous execution point in the event that one or more indirect branch or branch with link instructions is found to be cancelled. In the embodiment of FIG. 1A, the history buffer 170 stores an instruction identifier indexing at least a subset of instructions that resulted in data being either stored to or removed from the ETM data store 168 and together with that instruction identifier index, also provides an indication whether that operation was a storage (i.e. a push onto the data store) or a removal (i.e. a pop from the data store).

The restoration buffer 172 stores a list of instruction addresses associated with data store pop operations, i.e. instruction addresses that were removed at any point from the data store. The number of instruction addresses associated with data store pop operations that can be stored depends on the restoration buffer 172 capacity for the particular implementation. In this embodiment, memory addresses that were pushed onto the data store are not separately stored in the restoration buffer 172 because they are already present in the data store 168. Thus an individual entry in the restoration buffer 172 has the same contents as a corresponding entry on the data store 168 in view of the fact that the address itself is stored there.

In the embodiment of FIG. 1A, the data store 168, history buffer 170 and restoration buffer 172 are part of the ETM 160. However, in alternative embodiments, these three components could be fabricated such that they are part of the CPU 120.

Figure 1B:
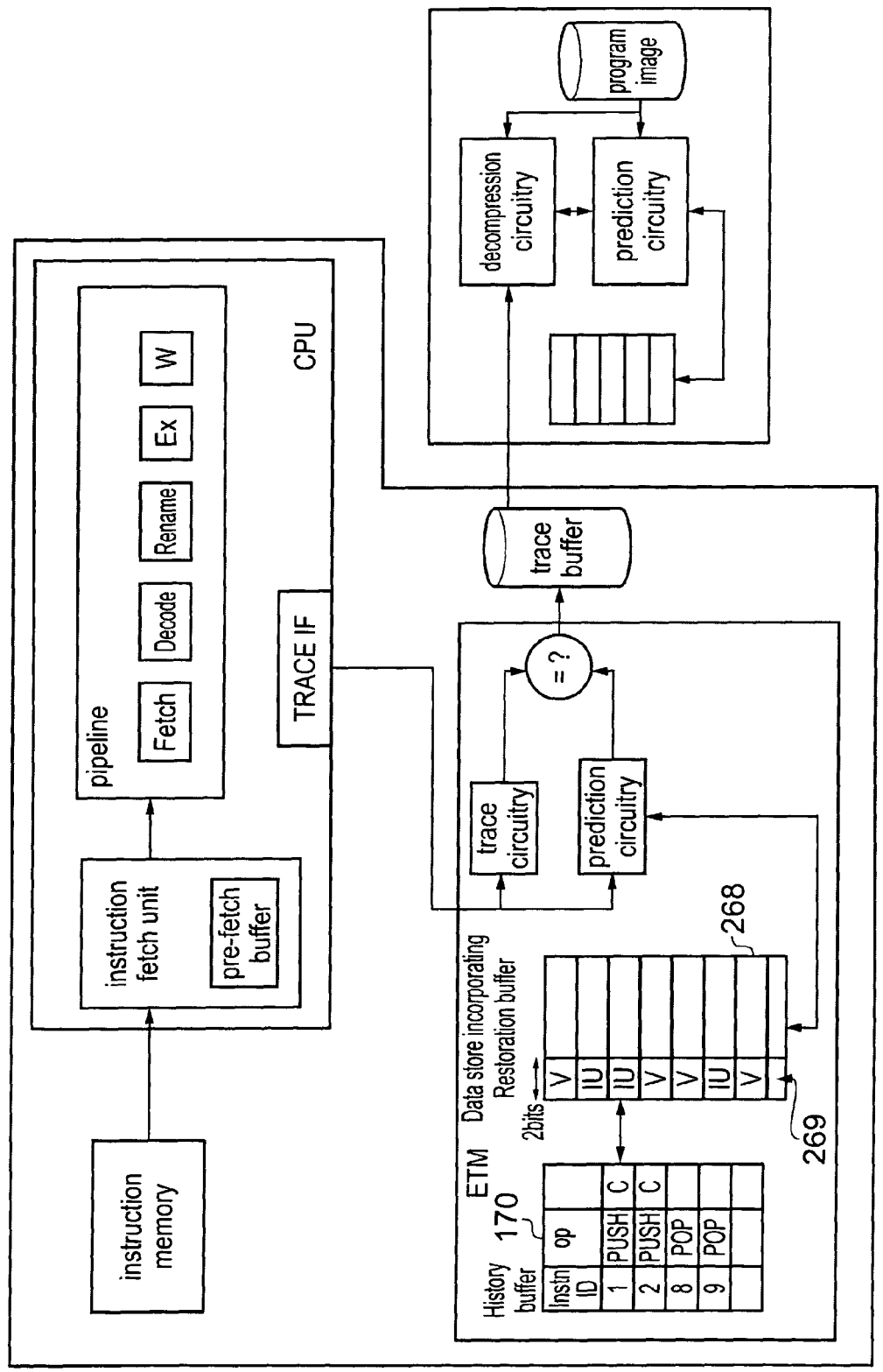
FIG. 1B schematically illustrates a trace unit and diagnostic apparatus according to a second embodiment of the present invention in which the restoration buffer is configured such that it is integrated with the data store although the history buffer is a separate memory unit.

FIG. 1B schematically illustrates a second embodiment of the present invention. This embodiment is very similar to the embodiment of FIG. 1A, but differs from the embodiment of FIG. 1A in that the restoration buffer 172 of FIG. 1A is not provided, but instead a data store 268 of FIG. 1B is used to perform the functions of both the ETM data store 168 and the restoration buffer 172 of FIG. 1A. Thus in the embodiment of FIG. 1B, the restoration buffer for recording addresses popped from the data store 268 in response to receipt of cancel instructions is provided within the data store 268 itself, rather than having a separate store (restoration buffer 172 of FIG. 1A).

Accordingly, the data store 268 comprises an additional field to indicate for each entry of the data store whether or not that entry it is currently valid. In this embodiment, there are three possible states for each entry and thus a two-bit field 269 is provided within the data store 268 next to each data store address. The three different states of each entry are: (a) valid (V); (b) invalid (I); or (c) in use but invalid (IU). When a data store entry is popped from the data store the status of the entry changes from valid (V) to in use (IU). When an entry is pushed back onto the data store due to mis-speculation the entry status changes from in use (IU) to valid (V). An entry changes status from in use (IU) to invalid (I) during mis-speculation if the history buffer 170 indicates a push token, to avoid restoring invalid values to the data store. If a pop token is subsequently encountered which would restore an invalid value then the data store should be flushed.

Note also that in the embodiment of FIG. 1A when any speculation was resolved and the speculatively executed instruction was committed as confirmed by the ETM trace circuitry 162, the entry in the history buffer 170 (i.e. the push operation) associated with that committed branch to subroutine instruction was deleted upon committal. However, in the alternative embodiment of FIG. 1B, instead of deleting items from the history buffer 170 upon committal of the speculatively executed instruction, history buffer entries are marked as committed. This is indicated by a "C" against the relevant history buffer entry in FIG. 1B. This allows the ETM 160 to detect when the history buffer 170 is truly empty and to distinguish between a truly empty a history buffer 170 and a history buffer 170 where all of the speculatively executed instructions have been resolved. This can help to avoid unnecessary flushes of the data store.

FIG. 2 is a table that schematically illustrates how, without implementation of the history buffer 170 and the restoration buffer 172 according to embodiments of the present invention, the data store 168 of the ETM 160 can become out of step with the corresponding data store 186 of the diagnostic apparatus 180. The table of FIG. 2 lists a series of nine stages corresponding to execution of instructions of an example computer program. At each of the execution stages 1 through 9 (see first column of table) a corresponding execution event (see second column) is listed and the corresponding trace information received by the ETM trace circuitry 162 (see third column of Table 2) is also specified. The fourth column of the table of FIG. 2 indicates the consequences of the execution event for what is stored on the data store 168 of the ETM. Note that the contents of the data store listed in the fourth column of the table of FIG. 2 are based on what would be stored in a data store that does not implement either the history buffer 170 or the restoration buffer 172 of FIG. 1.

At stage 1 of the table of FIG. 2, a branch link instruction (BL) is executed at an instruction address of 0x1000 and the program branches to the address 0x2000 to execute a subroutine. This branch is taken and when it is, the return address 0x1004 of the branch link instruction is pushed onto the ETM data store 168. Next at stage 2 an instruction at an address 0x2000 is executed. This is a further branch link (BL) instruction that involves a branch to a subroutine at address 0x3000. This branch is taken by the program code, but prior to taking the branch, the prediction circuitry 164 pushes the return address 0x2004 for the branch onto the data store.

Next at stage 3 a move instruction (MOV) at address 0x3000 is executed. However, nothing is stored on the data store in response to the execution of the MOV instruction because the data store only stores return addresses for a subset of instructions comprising branch to subroutine instructions. Next at stage 4, a branch to a link register (BX LR) instruction at an address 0x3004 is executed. In this case the branch is in fact taken (see third column). The address 0x2004 stored in the link register matches the top entry on the data store stored in response to execution of the stage 2 BL instruction so the branch target address is not traced and the address stored on the top of the data store is popped (i.e. removed) from the data store at stage 4.

Next, at stage 5 the ETM 160 receives an interrupt from the CPU 120 indicating that mis-speculation has occurred and those instructions back to the address 0x3000 (corresponding to stage 3) should be cancelled. Thus the MOV and BX LR instructions speculatively executed at stages 3 and 4 are to be cancelled by the ETM tracing circuitry 162. The interrupt is taken at stage 5 and then at stage 6 the program returns from the exception. At stage 7 a MOV instruction at address 0x3000 is executed, in fact the stage 7 instruction is identical to the cancelled stage 3 instruction. Next at stage 8 a BX LR instruction at address 0x3004 is executed specifying a link address of 0x2004 (identical to the cancelled stage 4 instruction). In this case the ETM tracing circuitry 162 indicates that the branch is taken note that the address 0x2004 was removed from the data store at the now cancelled stage 4. Accordingly there is no match with the top entry on the data store upon return from the stage 8 branch with link instruction because the address at the top of the data store is 0x1004.

Next at stage 9 another branch with link instruction BX LR is executed corresponding to an instruction address 0x2004 and having a branch return address of 0x1004. This branch is also taken (as indicated in third column) and because the address 0x2004 was popped from the data store at stage 4 and never copied back onto the data store, the return address 0x1004 of the stage 9 instruction matches the top entry on the data store so the target is not traced. Because there is a match, the address 0x1004 is the popped from the data store so that at the end of stage 9 the data store of the ETM 160 is empty.

Stages 4 and 9 of the table of FIG. 2 both involve determining that a data store match has occurred with the top entry on the data store. When analysing the trace, the diagnostic apparatus spots that an indirect branch or return from subroutine has occurred and thus expects a branch target to be traced. When a branch target is not traced, it assumes that a return stack match has occurred and thus pos an entry from the return stack.

Figure 3:
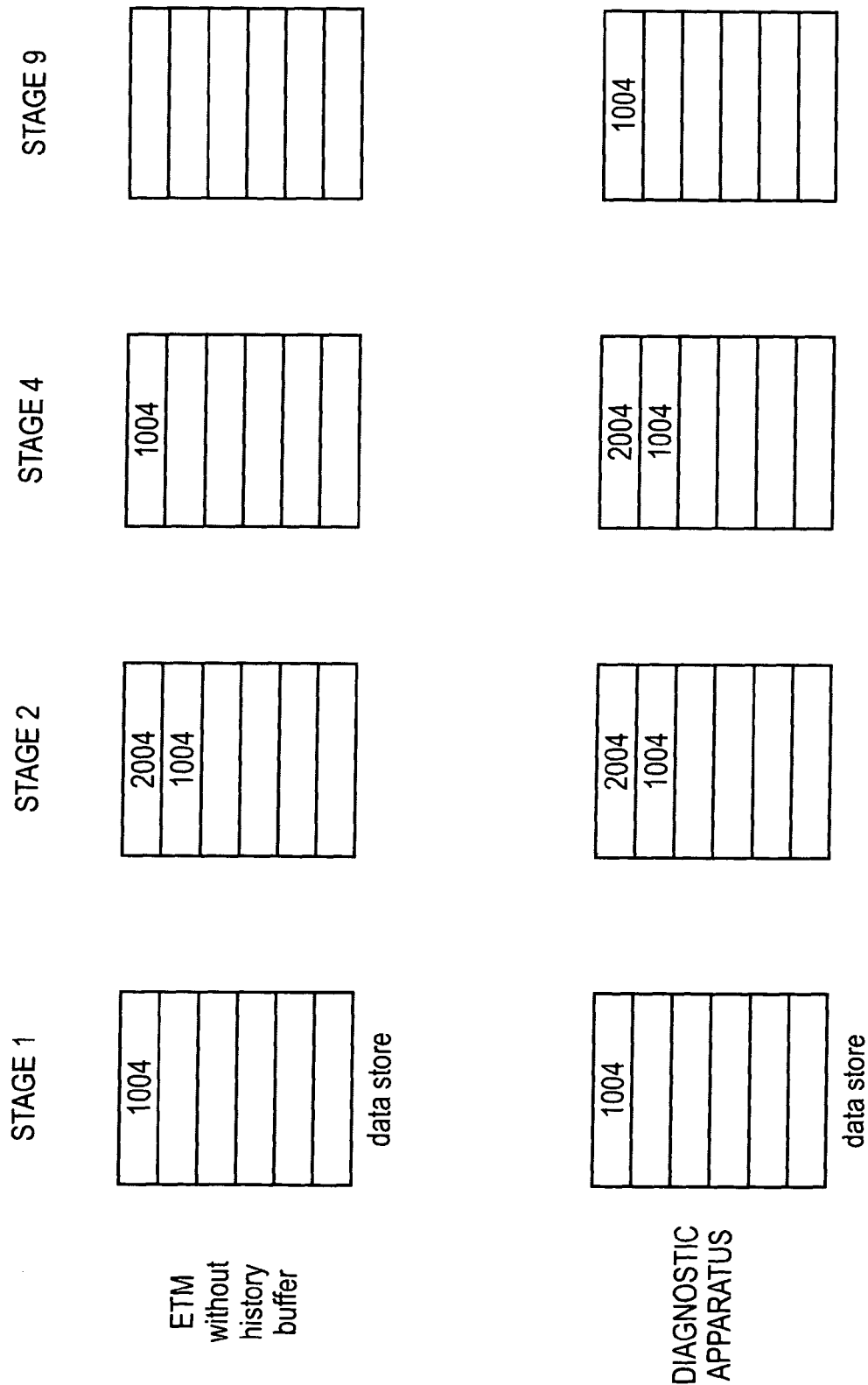
FIG. 3 schematically illustrates the contents of the data store of the trace unit and the corresponding contents of the data store of the diagnostic apparatus at various different execution stages corresponding to the table of FIG. 2.

FIG. 3 schematically illustrates the contents of the data store 168 of the ETM 160 corresponding to stages 1, 2, 4 and 9 of the execution sequence of the table of FIG. 2 example together with the contents of the data store 186 of the diagnostic apparatus for the same four key stages. As seen from FIG. 3, at stage 1 the address 0x1004 has been pushed onto the ETM data store 168 corresponding to the address subsequent to the stage 1 BL instruction 0x1000. The address 0x1004 is the return address for this stage 1 BL instruction. At stage 1 the data store 186 of the diagnostic apparatus has identical contents to the data store of the ETM. At stage 2, a further address is pushed onto the data store of both the ETM data store and the diagnostic apparatus data store so that each of the two data stores has a top entry of address 0x2004 and a second entry of address 0x1004. This is because the top address on the data store corresponds to an address immediately subsequent to the address 0x2000 corresponding to the branch link (BL) instruction executed at stage 2. At stage 4, the data store 168 of the ETM 160 comprises a single entry of the address 0x1004, because the address 0x2004 was popped from the data store when a match occurring with the top entry when the stage 4 BX LR instruction was executed. However, at stage 4 the data store 186 of the diagnostic apparatus becomes out of step with the data store 168 of the ETM 160 due to the fact that the decompression circuitry 182 removes the speculatively executed instructions corresponding to stages 3 and 4 prior to analysing the data store 186 and thus, unlike the ETM data store 168, does not remove the address 0x2004 from the data store at stage 4.

At stage 9 the data store 168 of the ETM is completely empty as a result of the address 0x1004 having been popped from the data store due to the match that occurred at stage 9. The result of the address 0x2004 not having been removed from the data store 186 of the diagnostic apparatus is that the decompression circuitry 182 branches to the wrong address, 0x2004. At stage 9 the data store of the diagnostic apparatus comprises a single entry corresponding to the address 0x1004.

FIG. 4 schematically illustrates a table detailing trace and data store events corresponding of the nine execution stages of the table of FIG. 2, but in an apparatus implementing the history buffer 170 and the restoration buffer 172 of FIG. 1A. The FIG. 4 table also applies to the apparatus of FIG. 1B, which implements the history buffer 170 and data store 168 incorporating the validity indicator 269.

Figure 5:
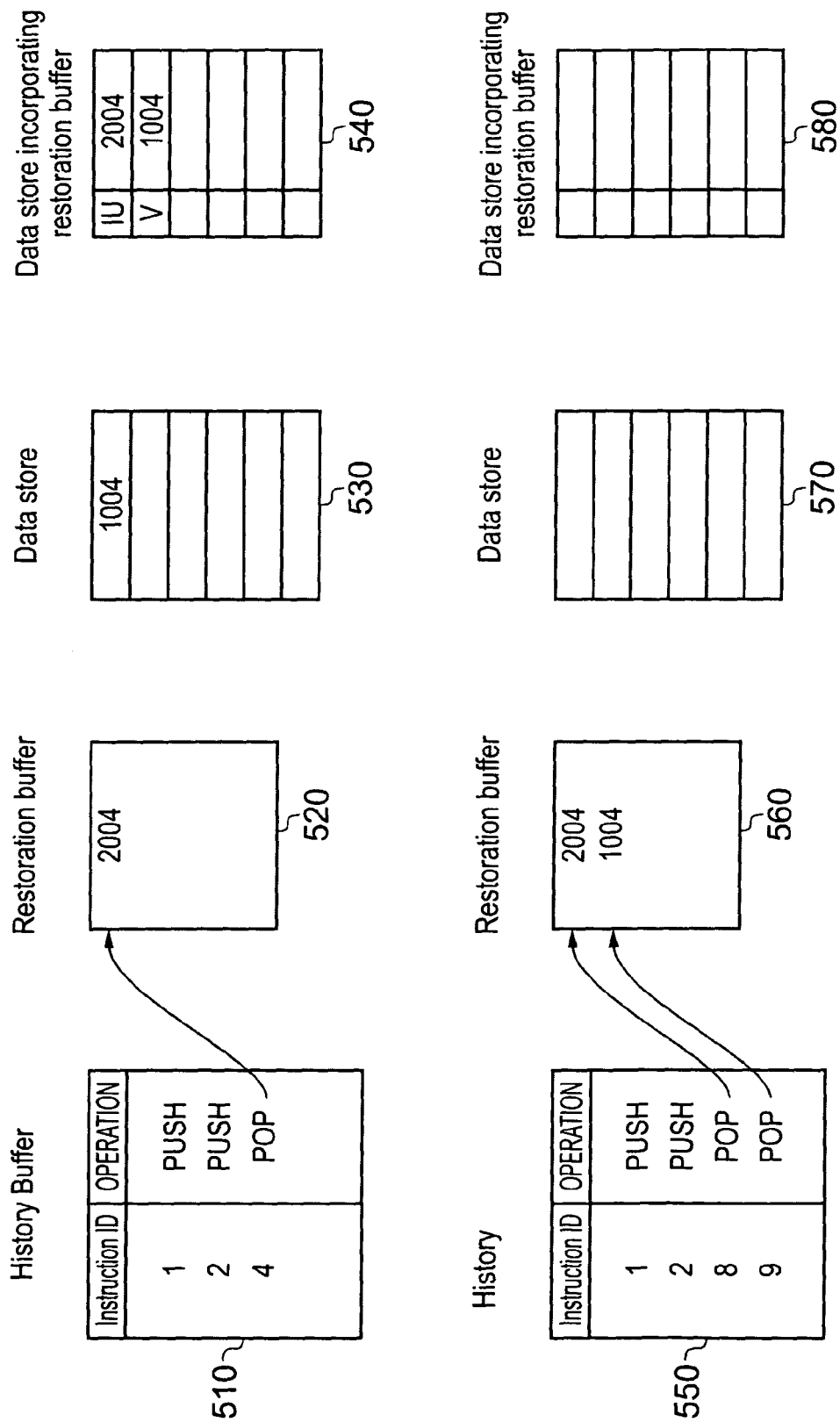
FIG. 5 schematically illustrates the contents of the history buffer and the restoration buffer as well as the data store for the sequence of instructions of the table of FIG. 4.

As described above, the history buffer 170 is used to track historical activity on the ETM data store 168 and to enable restoration of old data to the data store 169 following mis-speculation. FIG. 5 schematically illustrates the contents of the history buffer 170 and the restoration buffer 172 of the embodiment of FIG. 1A and the corresponding contents of the data store 268 of embodiment of FIG. 1B, which stores the information that would otherwise be stored in the restoration buffer 172 of FIG. 1A with the data store 268 itself thus avoiding the requirement for a separate restoration buffer 172.

In the table of FIG. 4, the nine stages and corresponding nine execution events are identical to the corresponding stages and execution events listed in the table of FIG. 2. The corresponding entries in the trace column (third column from left) of the FIG. 4 exactly match the entries in the trace column in the table of FIG. 2. However, the updates to the data store (shown in the right-most column) differ between the FIG. 2 table and the FIG. 4 table due to the fact that the FIG. 4 table represents data store updates in an embodiment of the invention incorporating the history buffer 170 and restoration buffer 172 whereas the FIG. 2 table represents an arrangement with a data store but no history buffer 170 and no restoration buffer 172 or data store entry status indicator 269.

The right-most column of the FIG. 4 table, lists the actions performed by the ETM 160 in terms of popping and pushing entries to and from the data store and entering data into the history buffer 170 and the restoration buffer 172. For stages 1 and 2 an address 0x1004 is first pushed onto the data store and next an address 0x2004 is pushed onto the data store, similarly to the FIG. 2 table. However, in this case each time an address is pushed onto the data store a "push" token is added to the history buffer 170. This is shown in table 510 of FIG. 5, which illustrates entries in the history buffer 170 at a snap shot in time just after execution of the stage 4 instruction. As can be seen in the table 510, the stage 1 instruction has an instruction ID 1, stage 2 instruction has an instruction ID 2 and the stage 4 instruction has an instruction ID 4. It can be seen that a push token "operation" has been entered in relation to stage 1 and stage 2 whereas a pop token has been entered in relation to stage 4. The pop token listed against instruction ID 4 in table 510 corresponds to the address 0x2004 having been popped from the data store upon execution of the branch to link register BX LR instruction at stage 4.

Each time an entry is removed from the data store 168, that entry is stored in the restoration buffer 172, but when entries are pushed onto the data store 168 there is no corresponding entry made in the restoration buffer 172. FIG. 5 shows a restoration buffer 520 (corresponding to a snapshot in time of the restoration buffer 172) at the end of execution of the stage 4 instruction. In this case, because the instruction address 0x2004 has been popped from the data store, a corresponding entry is made in the restoration buffer. The stage 5 execution event in the FIG. 4 table is an interrupt indicating that the instructions at stage 3 and stage 4 should be cancelled. When the interrupt is taken by the CPU 120 at stage 5, the history buffer 170 is analysed by the ETM 160 and it can be identified from the instruction ID 4 that an address was popped from the data store corresponding to one of the cancelled instructions. Accordingly, the address of the popped item from the data store is retrieved from the restoration buffer 520 and restored back to the data store 168 to restore the data store to the status it would have had prior to the execution of instructions 3 and 4.

This is in contrast with the status of the data store at the end of stage 5 in the FIG. 2 table where the address 0x2004 was popped from the data store but never returned. The effects of this difference are apparent at the end of execution stage 8 in the FIG. 4 table, where upon execution of the branch to link register BX LR instruction a branch is taken with the target address 0x2004 and this time the address 0x2004 matches the top entry on the data store. Accordingly, there is no need to trace the target. By way of contrast, at stage 8 of the FIG. 2 table there was no match between the BX LR target address 0x2004 and the top entry of the data store so it was necessary to trace the target for execution stage 8.

Returning to the FIG. 4 table, because there is a match between the top entry of the data store and the branch target address at stage 8, the address 0x2004 is popped from the data store and a pop token is again added to the history buffer 170 with the corresponding address 0x2004 being moved from the data store 168 to the restoration buffer 172. Finally, at stage 9 a further branch to link register BX LR instruction is executed with a return address of 0x1004 and, similarly to execution stage 8, a match is found with a top entry on the data store and there is no need to trace the target. Following the match at stage 9 the address 0x1004 is popped from the data store, a pop token is added to the history buffer 170 together and the popped address is stored in a restoration buffer.

Thus, as shown in FIG. 5, the restoration buffer 560, corresponding to a snapshot of the contents of the restoration buffer 172 at the end of execution stage 9 of the table of FIG. 4 comprises the two branch target addresses 2004 and 1004, which were copied in there at stages 8 and 9 when these addresses were popped from the data store 168. Also shown is a history buffer snapshot 550 corresponding to the status of the history buffer 170 at the end of execution stage 9. The history buffer snapshot 550 shows four instruction identifiers with push tokens corresponding to instruction IDs 1 and 2 and pop tokens corresponding to instruction IDs 8 and 9. At the end of execution of stage 9, the data store 570 is empty because all of the entries have been popped. By way of contrast, at the end of execution of stage 4, the data store 530 contained a single entry corresponding to address 0x1004 (the further address 0x2004 having been popped from the data store and not yet restored).

The ETM data store 268 of the embodiment of FIG. 1B at a point in time corresponding to the end of execution stage 4 instruction of the FIG. 4 table is shown in FIG. 5 as the data store 540. In this case, instead of deleting the entry 2004 from the data store, the indicator bits indicate that only the address 1004 is valid (V) whereas the address 2004 is invalid and in use (IU) i.e. address 2004 has been popped from the data store but could yet be restored.

FIG. 5 shows that in the event of a branch to subroutine (i.e. when a "BL" instruction is executed) at stage 1 and stage 2 of the table of FIG. 4, corresponding to instruction IDs 2 and 4 in FIG. 5, an address is pushed onto the data store 530, 570. On return from a subroutine for instruction IDs 4, 8 and 9 in FIG. 5 (i.e. when a "BX LR" instruction is executed in FIG. 4) an address is popped from the data store 530, 570 and a "POP" token is added to the history buffer 510, 550.

Thus, according to the present technique, a history buffer 170 is provided that is updated upon each and every ETM data store operation and each entry in the history buffer 170 comprises an identifier which is related to the instruction executed (speculatively executed or otherwise) and further comprises a token identifying whether the data store operation was a push or a pop operation. The restoration buffer 172 is also provided to keep a record of all addresses that are removed from the data store. The restoration buffer 172 of the FIG. 1A embodiment has entries with the same contents as a corresponding entry on the data store. In the event of a data store 168 push operation, an instruction identifier is entered into the history buffer 170 with a token indicating that a push operation has occurred. On the other hand, in the event of a data store pop, an instruction identifier is written into the history buffer 170 together with a pop operation identifier. In the case of a pop operation (but not a push operation), the address popped from the data store is also placed in the restoration buffer 172.

In the event of mis-speculation of an instruction or in the event of a pre-fetched instruction having being cancelled by the CPU 120, the following algorithm is executed by the ETM 160.

---

On mis-speculation (cancel):
    Work backwards through the history buffer (most recent first):
        If keys identify the entry was cancelled:
            If entry is a "push" token:
                Pop most recent entry from the data store
            If entry is a "pop" token:
                Pop the address from the restoration buffer
    and push back onto the data store
            Remove entry from history buffer
        Else:
            End
    If history buffer is now empty:
        Flush data store

---

This algorithm essentially provides that when a cancel instruction is received via the trace interface 150 of the CPU at the ETM trace circuitry 162, the ETM 160 works backwards through the history buffer 170 starting from the most recent entry and if it is identified that any entry in the history buffer 170 relates to a cancelled instruction then different actions are taken depending upon whether the history buffer indicates that the cancel operation relates to a push operation or a pop operation. If the cancelled instruction relates to a push operation, then the most recent entry is simply removed from the data store. However, if the cancelled instruction corresponds to a pop operation then the historical data stored in the restoration buffer 172 is used to restore the data store to its status prior to execution of the cancelled instruction. The relevant address that was previously removed from the data store by the cancelled instruction is restored back to the data store and then the entry is removed from the history buffer 170.

In the event that a cancel instruction is received and the history buffer 170 is found to be empty, then the data store 168 is flushed as a precaution to prevent items remaining on the data store when it cannot be determined whether or not they relate to cancelled instructions. The ability to flush the data store enables the size of the relative sizes of the data store and the 168 and the history buffer 170 to be varied independently to find the most cost effective combination. The sizes of each of the data store 168 and the history buffer 170 can either be static or dynamic depending upon implementation.

When information related to a pre-fetched instruction or a speculatively executed instruction is received by the ETM trace circuitry 162 from the CPU 120 indicates that the speculation has been resolved and the instruction has been committed by the CPU 120 then the ETM 160 works forward through the history buffer 170 and either removes any entry from the history buffer 170 that was committed (as in the embodiment of FIG. 1A) or alternatively retains all committed entries in the history buffer but marks them as committed to distinguish them from other entries in the history buffer. The embodiment of FIG. 1A executes the following algorithm upon receiving confirmation that the speculatively executed instruction has been committed.

---

On speculation confirmation (commit):
    Work forwards through the history buffer (oldest first):
        If keys identify the entry was committed:
            Mark entry in history buffer as committed

---

Figure 6:
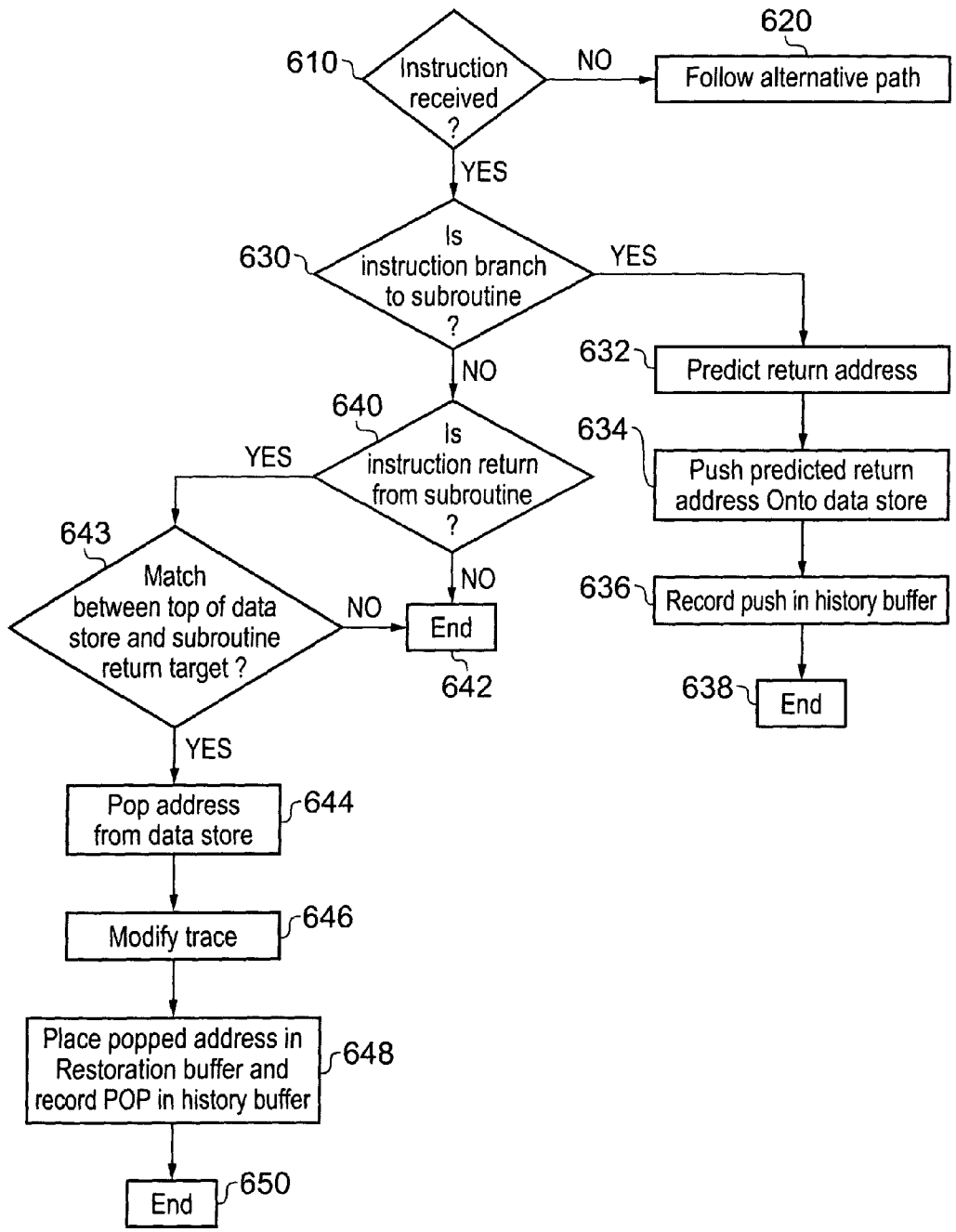
FIG. 6 is a flow chart that schematically illustrates a sequence of steps carried out by the trace unit of an embodiment of the present invention in response to receipt of an instruction from the data processing apparatus.

FIG. 6 is a flow chart that schematically illustrates a sequence of steps performed by the ETM 160 of FIG. 1A in response to receiving from the trace interface 150 of the CPU 120 trace information relating to an instruction. The process begins at stage 610 where it is determined by the ETM trace circuitry 162 whether or not an instruction has been received. If no instruction is received then the process proceeds to step 620 where an alternative path is followed, for example, the flow chart of FIG. 7. If it is determined at stage 610 that an instruction has been received, then the process proceeds to stage 630, where it is determined if the instruction is a branch to a subroutine instruction. If the instruction is determined at stage 630 to be a branch to subroutine (e.g. a branch-with-link instruction) then the process proceeds to stage 632 where the prediction circuitry 164 makes a prediction with regard to a return address for the received instruction i.e. the return address for the branch back from the subroutine. Next at stage 634 the predicted return address is pushed onto the data store 168 then at stage 636 an instruction identifier together with an indication that a push has occurred is stored in the history buffer 170. However, in this case nothing is actually stored in restoration buffer 172 because it only stores information in relation to addresses popped from the data store 168. The process then ends at stage 638.

If on the other hand at stage 630 it is determined that the instruction is not a branch to subroutine, it is determined at stage 640 whether the instruction is a return from a subroutine e.g. an indirect branch. If the instruction is not a return from subroutine then the process ends at stage 642. Types of instructions other than branch with link instructions and indirect branch instructions have no effect on either the data store 168 or the history buffer 170 and that is why the process ends at stage 642.

If it is determined at stage 640 that the instruction does relate to a return from subroutine, then the process proceeds to stage 643 where it is determined whether or not there is a match between the entry at the top of the return stack and the subroutine return target. If there is no match then the process ends at stage 642. However, if there is a match at stage 643 then the process proceeds to stage 644 where the address at the top of the data store is popped from the data store. If a match is found between the actual return address and the address popped from the data store, then the trace stream output to the diagnostic circuitry 180 is modified accordingly. In particular, if there is a match then no trace data need be output with regard to this instruction whereas if no match is found then a return address or an indication of a return address is output to the diagnostic circuitry to enable reconstruction of the actual operation of the CPU 120.

After stage 644, the process proceeds to stage 646 where the trace is modified. Typically this involves replacing the branch target address with either: (a) an indication that a return stack match has occurred; or (b) nothing, since the absence of the address when it would be expected indicates that the address has matched the return stack. Following modification of the trace at stage 646 the process proceeds to stage 648 where the address that was popped from the data store 168 is stored in the restoration buffer 172 in case it should need to be restored to the data store in the event of a subsequent cancel instruction being received. An instruction identifier together with an indication that the pop operation has occurred is also placed in the history buffer 170 to enable that instruction to be tracked in the event of a cancel instruction being received from the CPU 120. The process then ends at stage 650.

Figure 7:
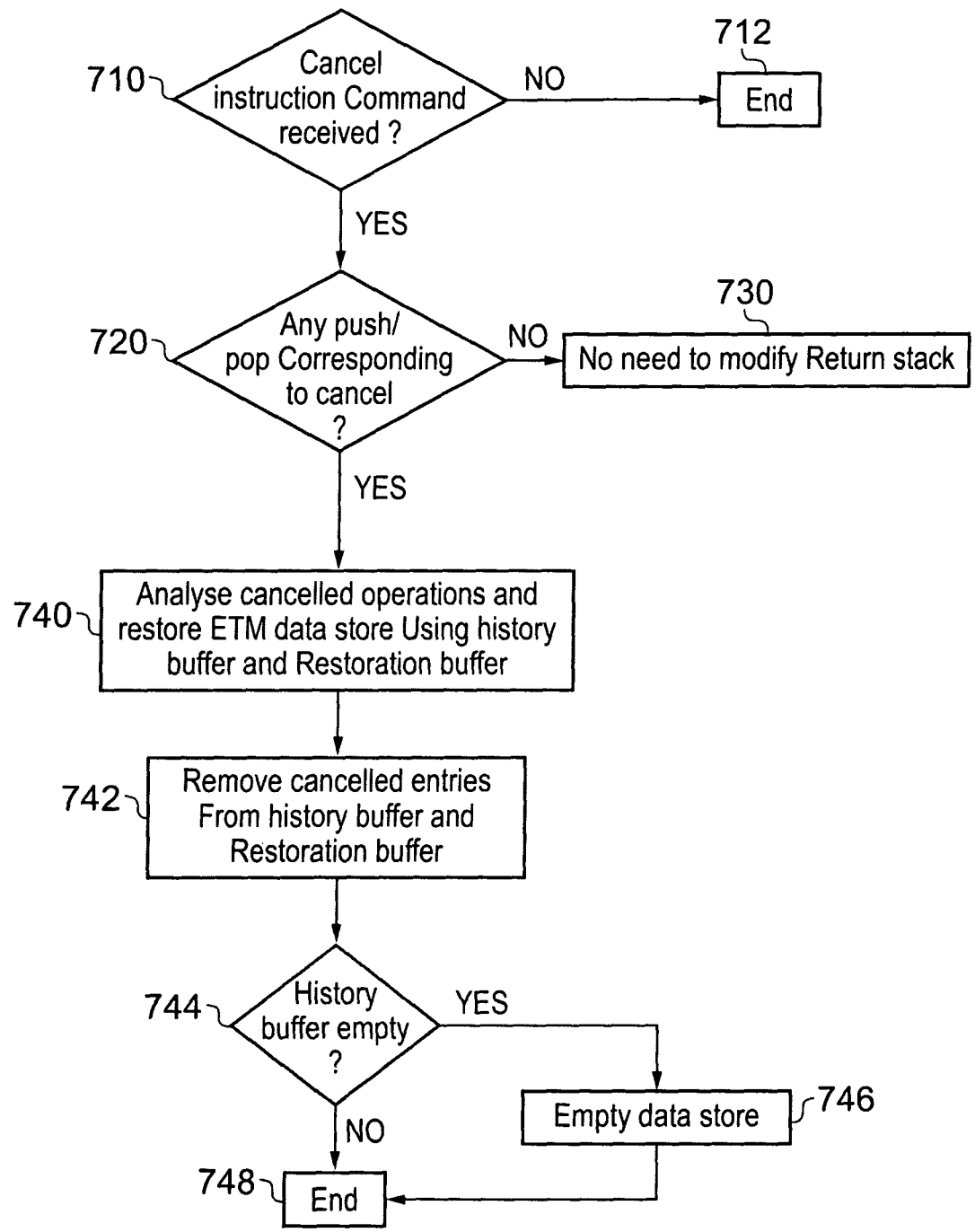
FIG. 7 is a flow chart that schematically illustrates response of a trace unit to receiving a command to cancel a speculatively executed instruction.

FIG. 7 schematically illustrates a sequence of operations performed in the event that a cancel instruction is received from the trace interface 150 by the trace circuitry 162. The process starts at stage 710, where it is determined whether information being received at the trace circuitry corresponds to a cancel instruction. If no cancel instruction has been received then the process ends at stage 712. Otherwise, if a cancel instruction has been received, the process proceeds to stage 720 where the history buffer 170 is searched to check for any instruction identifier corresponding to the cancelled instruction to determine whether any of the cancelled instructions relate to either a push operation to or a pop operation from the data store 168. If none of the cancelled instructions relate to a push or pop from the data store 168 then the process proceeds to stage 730 and the data store remains unmodified. If on the other hand it is determined that at least one of a push operation or a pop operation corresponds to one of to the cancelled instructions then the process proceeds to stage 740, where the ETM analyses the cancelled operations and restores the ETM data store 168 to a state corresponding to an execution point prior to the first cancelled instruction using the information stored in the history buffer 170 and any popped addresses stored in the restoration buffer 172. The process then proceeds to stage 742, where any entries associated with cancelled operations are removed from the history buffer and the restoration buffer. The process then proceeds to stage 744, where it is determined whether or not the history buffer is empty. If the history buffer is empty then the process proceeds to stage 746 where the data store is emptied and then the process ends at a stage 748. However, if the history buffer is found not to be empty at stage 744, the process proceeds directly to the end stage 748 without emptying the data store.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A trace unit configured to generate items of trace data indicative of processing activities of a data processing apparatus, said trace unit comprising;

prediction circuitry for predicting a response of said data processing circuitry at at least one given execution point to execution of a program instruction;

tracing circuitry for tracing operation of at least a portion of said data processing apparatus and for determining whether a predicted response to said program instruction is correct and for outputting a prediction indicator indicating whether or not said predicted response is correct;

a data store configured to store information relating to said predicted response of said data processing circuitry at said at least one given execution point for use by at least one of said prediction logic and said tracing circuitry at a later execution point; and a history buffer configured to store historical information with regard to one or more entries of said data store at a corresponding execution point prior to said at least one given execution point to enable restoration of said data store to a state corresponding to a previous execution point.

2. Trace unit as claimed in claim 1, wherein said program instruction comprises a future branch instruction and said prediction circuitry predicts response to execution of said future branch instruction.

3. Trace unit as claimed in claim 1, wherein said data processing apparatus is configured to perform speculative execution of program instructions and said tracing circuitry is configured to output trace data corresponding to at least one speculatively executed instruction before said speculatively executed instruction is committed by said data processing apparatus and wherein said previous execution point is an execution point prior to execution of said speculatively executed instruction.

4. Trace unit as claimed in claim 1, wherein said data processing apparatus is configured to perform speculative fetching of program instructions and said tracing circuitry is configured to output trace data corresponding to at least one speculatively fetched instruction before said data processing apparatus resolves whether said speculatively fetched instruction should be executed to completion and wherein said previous execution point is an execution point prior to execution of said speculatively fetched instruction having commenced.

5. Trace unit as claimed in claim 3, wherein said trace unit is configured to receive from said data processing apparatus a cancel indication indicating that said at least one speculatively executed instruction has been mis-speculated and wherein said trace unit is responsive to said cancel indication to use said historical information stored in said history buffer to restore said data store to a state prior to execution of said speculatively executed instruction.

6. Trace unit as claimed in claim 3, wherein said trace unit is configured to receive from said data processing apparatus a cancel indication indicating that said at least one speculatively executed instruction has been mis-speculated and wherein said trace unit is responsive to said cancel indication to update said data store to correct for said mis-speculation and to remove information associated with said mis-speculated instruction from said data store.

7. Trace unit as claimed in claim 5, wherein if following receipt of said cancel indication, said trace unit determines that said history buffer is empty, said trace unit is configured to flush said data store.

8. Trace unit as claimed in claim 3, wherein said trace unit is configured to receive from said data processing apparatus a commit indication indicating that said at least one speculatively executed instruction has been committed and said trace unit is responsive to said commit indication to remove any entries corresponding to committed ones of said speculatively executed instructions from said history buffer.

9. Apparatus as claimed in claim 3, wherein said trace unit is configured to receive from said data processing apparatus a commit indication indicating that said at least one speculatively executed instruction has been committed and said trace unit is responsive to said commit indication to mark any entries in said history buffer corresponding to committed ones of said speculatively executed instructions as committed entries.

10. Trace unit as claimed in claim 1, wherein said history buffer is configured to store an identifier for identifying a program instruction to which said predicted response relates.

11. Trace unit as claimed in claim 1, wherein said history buffer is configured to store information identifying if an operation performed on said data store was a pop operation involving removal of a data entry from said data store or a push operation involving writing a data entry to said data store.

12. Trace unit as claimed in claim 11, comprising a restoration buffer configured to store information corresponding to at least a portion of data removed from said data store during said pop operation.

13. Trace unit as claimed in claim 1, wherein said data store maintains a record of a current status of at least one data store entry, said current status indicating whether said predicted response information is valid, invalid or in use.

14. Trace unit as claimed in claim 13, wherein said current status is updated from valid to in use when said trace unit indicates that at least one data store entry should be removed from said data store.

15. Trace unit as claimed in claim 12, wherein said trace unit comprises a restoration buffer and said trace unit is configured for entries that have been indicated as having been removed from said data store to cause storage of a copy of said removed data to said restoration buffer to enable subsequent restoration of said removed data back to said data store.

16. Trace as claimed in claim 1, wherein said history buffer is updated upon each write to or eviction from said data store.

17. Trace unit as claimed in claim 1, wherein said data store has a first capacity and said history buffer has a second capacity and wherein said first capacity is different from said second capacity.

18. Trace unit as claimed in claim 12, wherein said data store and at least one of said history buffer and said restoration buffer are configured as distinct memory units with regard to the data store.

19. Trace unit as claimed in claim 12, wherein the data store comprises one or more of the restoration buffer and the history buffer as an integral part of the memory unit forming the data store.

20. A data processing apparatus comprising:
data processing circuitry for performing data processing operations;
prediction circuitry for predicting a response of said data processing circuitry at at least one given execution point to execution of a program instruction;
tracing circuitry for tracing operation of at least a portion of said data processing apparatus and for determining whether a predicted response to said program instruction is correct and for outputting a prediction indicator indicating whether or not said predicted response is correct;
a data store configured to store information relating to said predicted response of said data processing circuitry at said at least one given execution point for use by at least one of said prediction logic and said tracing circuitry at a later execution point; and
a history buffer configured to store historical information with regard to one or more entries of said data store at a corresponding execution point prior to said at least one given execution point to enable restoration of said data store to a state corresponding to a previous execution point.

21. A method of generating trace data indicative of processing activities of a data processing apparatus, said method comprising the steps of:
predicting a response of said data processing circuitry at at least one given execution point to execution of a program instruction;
tracing operation of at least a portion of said data processing apparatus and determining whether a predicted response to said program instruction is correct and outputting a prediction indicator indicating whether or not said predicted response is correct;
storing in a data store information relating to said predicted response of said data processing circuitry at said at least one given execution point for use by at least one of said prediction logic and said tracing circuitry at a later execution point; and
storing historical information with regard to one or more entries of said data store at a corresponding execution point prior to said at least one given execution point to enable restoration of said data store to a state corresponding to a previous execution point.

22. A trace unit configured to generate items of trace data indicative of processing activities of a means for processing data, said trace unit comprising;
means for predicting a response of said data processing circuitry at at least one given execution point to execution of a program instruction;
means for tracing operation of at least a portion of said means for processing data and for determining whether a predicted response to said program instruction is correct and for outputting a prediction indicator indicating whether or not said predicted response is correct;
means for storing information relating to said predicted response of said data processing circuitry at said at least one given execution point for use by at least one of said means for prediction and said means for tracing at a later execution point; and
means for store historical information with regard to one or more entries of said data store at a corresponding execution point prior to said at least one given execution point to enable restoration of said means for storing information to a state corresponding to a previous execution point.

23. A data processing apparatus comprising:
means for processing data;
means for predicting a response of said data processing circuitry at at least one given execution point to execution of a program instruction;
means for tracing operation of at least a portion of said means for processing data and for determining whether a predicted response to said program instruction is correct and for outputting a prediction indicator indicating whether or not said predicted response is correct;

means for storing information relating to said predicted response of said data processing circuitry at said at least one given execution point for use by at least one of said means for prediction and said means for tracing at a later execution point; and means for store historical information with regard to one or more entries of said data store at a corresponding execution point prior to said at least one given execution point to enable restoration of said means for storing information to a state corresponding to a previous execution point.

* * * * *